United States Patent [19]

Suzuki

[11] Patent Number: 5,003,398
[45] Date of Patent: Mar. 26, 1991

[54] ELECTRONIC STILL CAMERA

[75] Inventor: Masahiro Suzuki, Yokohama, Japan

[73] Assignee: Nikon Corporation, Tokyo, Japan

[21] Appl. No.: 441,980

[22] Filed: Nov. 28, 1989

[30] Foreign Application Priority Data

Nov. 30, 1988 [JP] Japan .................................. 63-303580

[51] Int. Cl.[5] ........................................... H04N 5/335
[52] U.S. Cl. ................................ 358/209; 358/213.16;
358/213.13; 358/213.26; 358/909; 358/228
[58] Field of Search ................... 358/909, 209, 213.19,
358/228, 213.13, 213.16, 213.26

[56] References Cited

U.S. PATENT DOCUMENTS

| 4,551,764 | 11/1985 | Ogawa | 358/228 |
| 4,710,825 | 12/1987 | Okita et al. | 358/342 |
| 4,743,778 | 5/1988 | Takatsu et al. | 307/311 |
| 4,843,474 | 6/1989 | Suzuki | 358/228 |
| 4,858,025 | 8/1989 | Tabei | 358/909 |
| 4,890,166 | 12/1989 | Kimura et al. | 358/909 |

*Primary Examiner*—John K. Peng
*Assistant Examiner*—Tuan V. Ho
*Attorney, Agent, or Firm*—Shapiro and Shapiro

[57] ABSTRACT

In an electronic still camera the time lag between shutter release and exposure of a solid state image pickup device is reduced by reducing the time required to discharge accumulated unnecessary charges (e.g., to remove noise caused by dark current). More particularly, the repetition rate of signals employed to discharge odd and even pixel fields of the pickup element is increased during an interval starting with a shutter release signal.

7 Claims, 5 Drawing Sheets

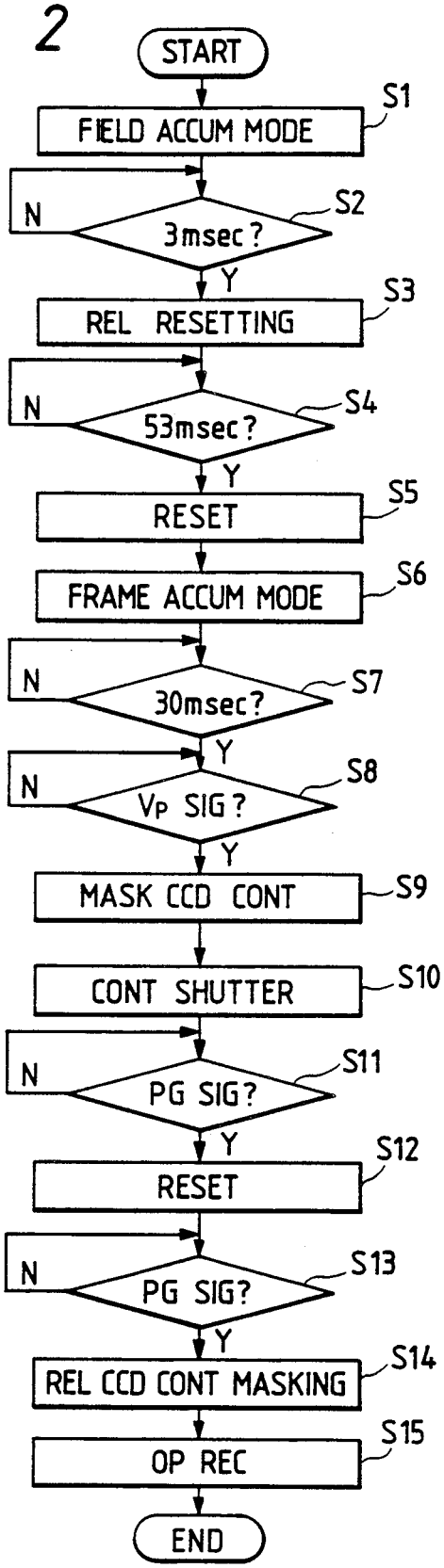

ELECTRONIC STILL CAMERA

BACKGROUND OF THE INVENTION

1. Field of the Invention

The present invention relates to an electronic still camera and particularly to the picture-taking operation of the camera.

2. Related Background Art

A typical construction of the circuit of an electronic still camera is shown in FIG. 5.

In the arrangement shown in FIG. 5, an object image is focused on a light receiving surface of a state image pickup element 104 through a lens 101 under an exposure condition selected by a diaphragm 102 and a mechanical shutter 103.

An output produced from the state image pickup element is converted into a video signal based on a format by a signal processing circuit 105 and then FM-modulated by a recording circuit 106. The modulated signal is recorded in a magnetic recording disk at a recording portion 107. A timing pulse generator 108 generates a driving pulse for the image pickup element 104 and a timing pulse required for the signal processing circuit 105. An operation control unit (central processing unit, CPU) 109 controls all of the timings for a series of picture-taking operations.

In the above-shown conventional apparatus, a picture is taken through the following operational steps whose time chart is shown in FIG. 6.

A picture-taking operation starts with falling of a release signal and a power supply for every circuit shown above is switched ON.

At the falling of a 1 CMg signal, the leading shutter blade of the mechanical shutter starts running and at the falling of a 2 CMg signal, the trailing shutter blade starts running. In other words, an exposure is started at the start of running of the leading shutter blade and is ended at the completion of running of the trailing shutter blade.

In FIG. 6, Vp signal is a signal synchronized with a vertical synchronizing signal with a delay of about 700 μsec. A TG pulse signal later described is within the Vp pulse. The start of running of the leading shutter blade mentioned above is in synchronism with a time immediately after a Vp signal.

PG signal is a signal for the start position of the magnetic disk of the recording portion. The signal is so controlled that revolution of the disk is coincident with one period of the vertical synchronization time.

RESET signal is a signal used for the phase shift of a PG signal and a Vp signal during recording and for another similar purpose. At the falling of this RESET signal, a synchronizing signal from the odd field side of the vertical synchronizing signal as well as every timing pulse start.

Odd TG and even TG signals are signals for readout of charge from the solid state image pickup element. The odd TG signal is used for readout of odd field pixels and even TG signal for readout of even field pixels. CCD control signal is a signal for masking the charge readout signal. The latter signal is masked for the time from exposure start to a time immediately before recording start. The time during which the exposure charge is read out from the image pickup element and recorded in the magnetic disk is determined by a recording time signal.

In the prior art apparatus, as seen from the timing chart, a discharging of unnecessary charge on the solid state image pickup element (especially discharging from its light-receiving part) is carried out during the time of from release to exposure start for the purpose of removing any noise, as caused by dark current.

Before releasing, since the power supply to the image pickup element is not ON, the element is in a thermally balanced state. In other words, the wells of the light-receiving part and transfer part are full of charge. In order to completely discharge it so as to empty the wells after releasing, readout of charge must be carried out more than at least three times continuously after releasing. To this end, usually, the readout operation is carried out at the rate of once per about 33 ms. (two vertical synchronization periods) in the frame accumulation mode, with odd field pixels and even field pixels being read out alternately, each for one vertical synchronization period. The repetition rate of odd TG signals and of even TG signals is half that of the vertical synchronization signals. This means that the drainage of unnecessary charge on the image pickup element must be carried out for a long time, more than 100 ms from releasing.

The readout of charge of odd field pixels is effected in response to an odd TG pulse and the readout of charge of even field pixels is effected in response to an even TG pulse. However, this drainage of unnecessary charge in the operation mode of frame accumulation involves the following problem.

As previously noted, in order to fully discharge the unnecessary charge, at least three times of readout are required for each pixel field. Therefore, in this case, an exposure can be started only after each pixel field has been read out at least three times or more. This means that the time passed from releasing to exposure start (time lag) is long. In order to shorten the time lag, the number of times of readout must be decreased. But, in this case, the remaining unnecessary charge is increased and, therefore, the noise increases.

SUMMARY OF THE INVENTION

Accordingly, the object of the present invention is to complete a drainage of the unnecessary charge on the solid state image pickup element (especially drainage of charge on the light receiving portion) in a shorter time from the time of releasing and reduce the time passed from releasing to exposure start.

According to this present invention, the object can be attained by

1. Operating the solid state pickup element with a mechanical shutter in the field accumulation mode (TG pulses are generated almost at the same time on the light receiving parts of the odd field and the even field) for an arbitrary time from releasing and thereafter returning the mode to the ordinary frame accumulation mode or;
2. Operating the solid state pickup element with an electronic shutter in an electronic shutter mode (two TG pulses are generated almost at the same time on the light receiving parts of the odd and even fields for one vertical synchronization period) for an arbitrary time from releasing and thereafter returning the mode back to the ordinary accumulation mode.

The features of the present invention described above bring about the following advantages over the prior art.

1. Since the operation is in the field accumulation mode for an arbitrary time from releasing, the readout of charge from the solid state image pickup element is increased (e.g., by two times), a complete drainage of the unnecessary charge is attainable and the time lag is reduced markedly.
2. Since the operation is in an electronic shutter mode for an arbitrary time from releasing, the readout of charge from the solid state image pickup element is increased (e.g., by four times), a complete drainage of the unnecessary charge is assured and the time lag is reduced to a further extent.

BRIEF DESCRIPTION OF THE DRAWINGS

FIG. 2 is a flow chart of operation of the embodiment;

DESCRIPTION OF THE PREFERRED EMBODIMENTS

The manner of operation of an embodiment of the present invention will be described below with reference to FIGS. 1A, 2 and 3.

Figure 1A:
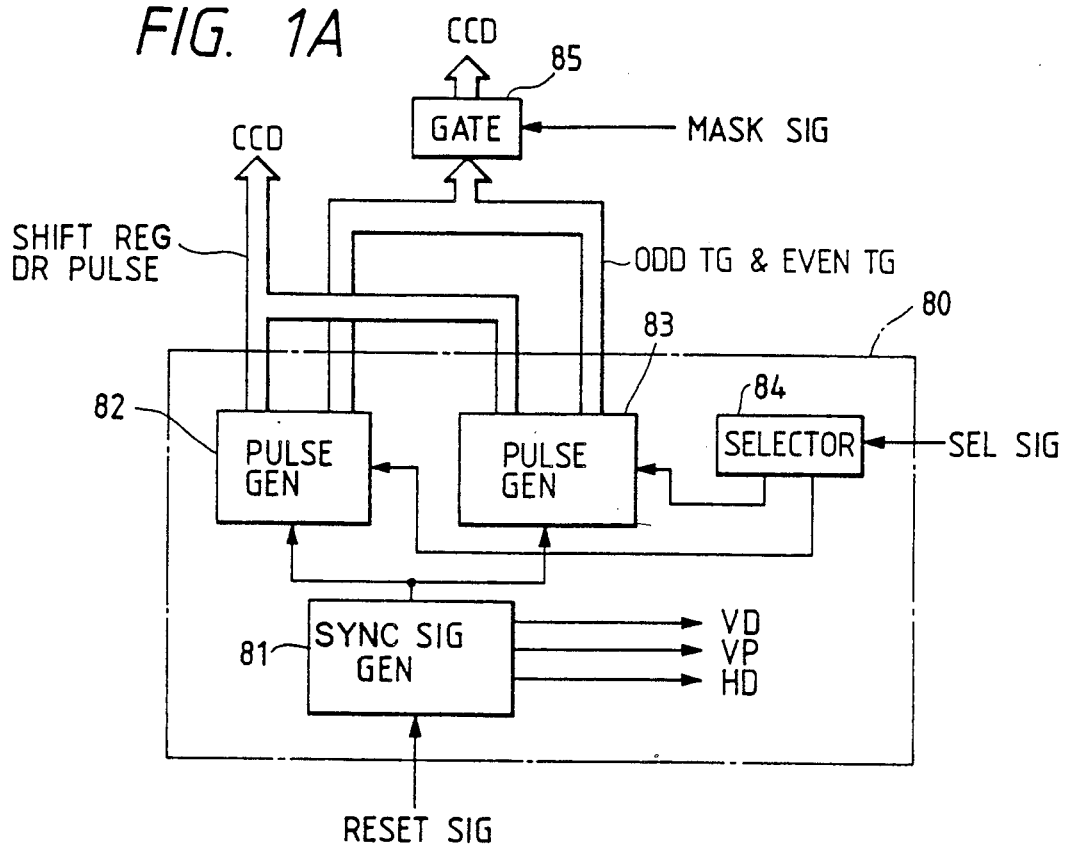
FIGS. 1A is a circuit diagram showing a first embodiment of a timing pulse generator according to the present invention.

Referring to FIG. 1A, a timing pulse generator 80 according to the invention comprises a synchronizing signal generator 81, a frame accumulation pulse generator 82, a field accumulation pulse generator 83 and a selector 84.

The synchronizing signal generator 81 generates a horizontal synchronizing signal HD, a vertical synchronizing signal VD, a synchronizing signal VP whose period is equal to that of the vertical synchronizing signal, and a synchronizing signal for driving the pulse generators 82 and 83.

Figure 5:
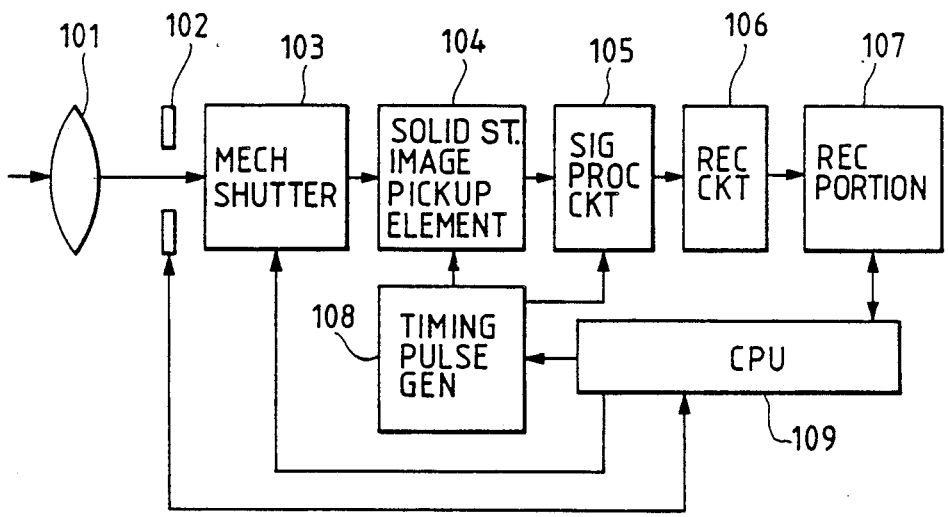
FIG. 5 is a block diagram showing the construction of a circuit in an electronic still camera.
Figure 6:
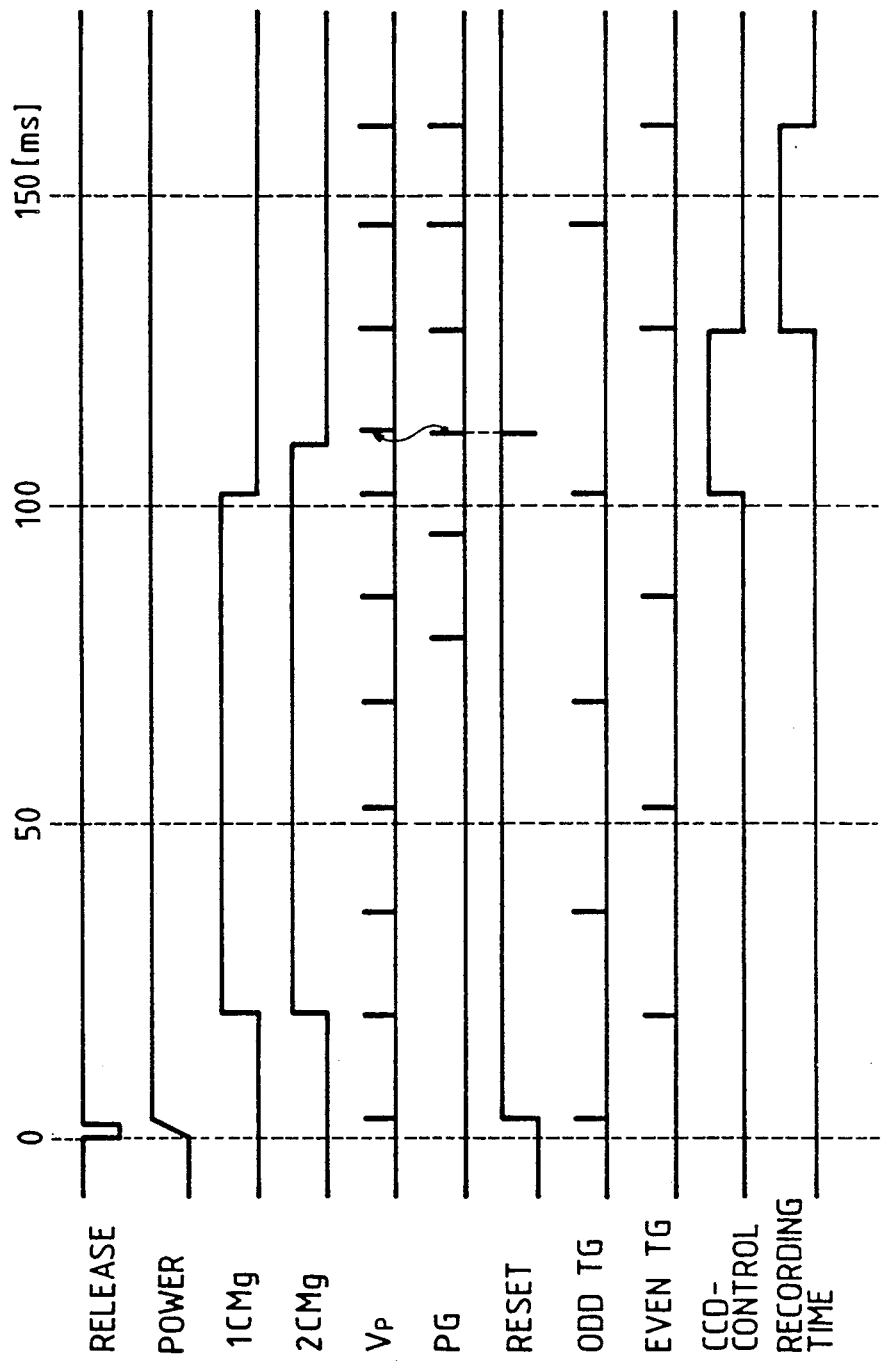
FIG. 6 is a time chart of the prior art apparatus.

The selector 84 selects one of the pulse generators 82 and 83 in response to a signal from the operation control unit (CPU) 109 (FIG. 5). The frame accumulation pulse generator 82 and the field accumulation pulse generator 83 generate pulses for driving a vertical transfer shift register 104V and a horizontal transfer shift register 104H of the solid state image pickup element shown in FIG. 1B and pulses for driving a transfer gate.

The gate 85 controls the input of a transfer gate (TG) pulse to the solid state image pickup element in accordance with a masking signal from CPU 109.

Figure 1B:
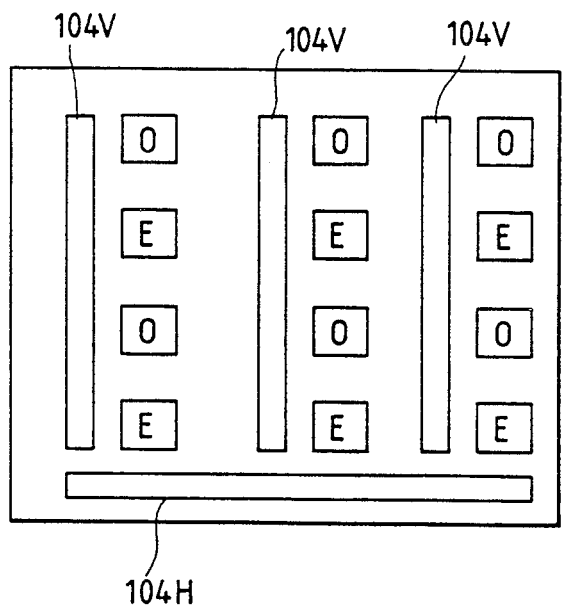
FIG. 1B is a schematic view of a solid state image pickup element.

In the frame accumulation mode in which the operation of the solid state image pickup element is carried out in accordance with the frame accumulation pulse generator 82, the light-receiving parts of the image pickup element are divided into odd field pixels O and even field pixels E as shown in FIG. 1B, and a time difference of 1/60 sec. is set between the timing of readout of charges on the light-receiving part corresponding to the odd field pixels and the timing of readout of charges on the light-receiving part corresponding to the even field pixels. For each field, the charge accumulation time is set to 1/60 sec.

In the field accumulation mode in which the operation of the solid state image pickup element is carried out in accordance with the field accumulation pulse generator 83, the charge accumulation time is 1/60 sec., an odd TG pulse and an even TG pulse are generated every 1/60 sec. with a phase shift of 60 $\mu$sec. between the two pulses.

The transfer gate pulse has a width narrower than that of the synchronizing signal Vp and is generated within the signal Vp.

With an operation of releasing, a series of operations shown in the flow chart of FIG. 2 starts. The timing of the operations is shown in FIG. 3 (described later in detail).

At the releasing, the reset signal is Low Level and the timing pulse generator is not operating. The accumulation mode selection signal (Frame/Field in FIG. 3) to the solid state image pickup element is also Low Level and the selector 84 selects the field accumulation pulse generator (field (accumulation mode) at step S1.

An internal timer within the CPU 109 starts counting from the time of releasing.

At the step S2, a discrimination is made as to whether the internal timer has counted 3 msec. or not. When the timer has counted 3 msec., the reset signal is output at the step S3. Thus, the reset signal is turned to High Level by which the timing pulse generator is brought into operation to generate every pulse.

At the step S4, a discrimination is made as to whether the internal timer has counted 53 msec. from the the reset output at S3. During this interval, on the solid state image pickup element, a readout of charge is being carried out in the field accumulation mode.

When the timer has counted 53 msec., the reset signal is momentarily turned to Low Level for 10 $\mu$sec. at the step S5 to initialize the timing pulse generator. At the same time, the accumulation mode is changed over to the frame accumulation mode at the step S6 and the frame accumulation pulse generator 82 is selected, The technique for resetting the synchronizing signal is disclosed in U.S. Pat. No. 4,710,825 assigned to the same assignee as that of the present invention.

At the step S7, a discrimination is made as to whether the internal timer has counted 30 msec from the resetting at S5. After verifying the generation of a Vp signal at the step S8, a mask signal (CCD control in FIG. 3) is turned to High Level at the step S9. During the time when the mask signal is High Level, no TG pulse is supplied to the image pickup element. That is to say, this time is a charge readout inhibition time.

At the step S10, the motion of the leading and trailing shutter blades is controlled.

After verifying the generation of a PG signal at the step S11, the synchronizing signal generator 81 is reset at the step S12 in the same manner as at the step S5.

At the step S13, like the step S11, it is checked whether a PG signal is generated. When the generation of the signal is confirmed, the mask signal is turned to Low Level at the step S14 to allow recording. At the step S15, a recording operation is started and the video signal is recorded in the magnetic disk.

Figure 4:
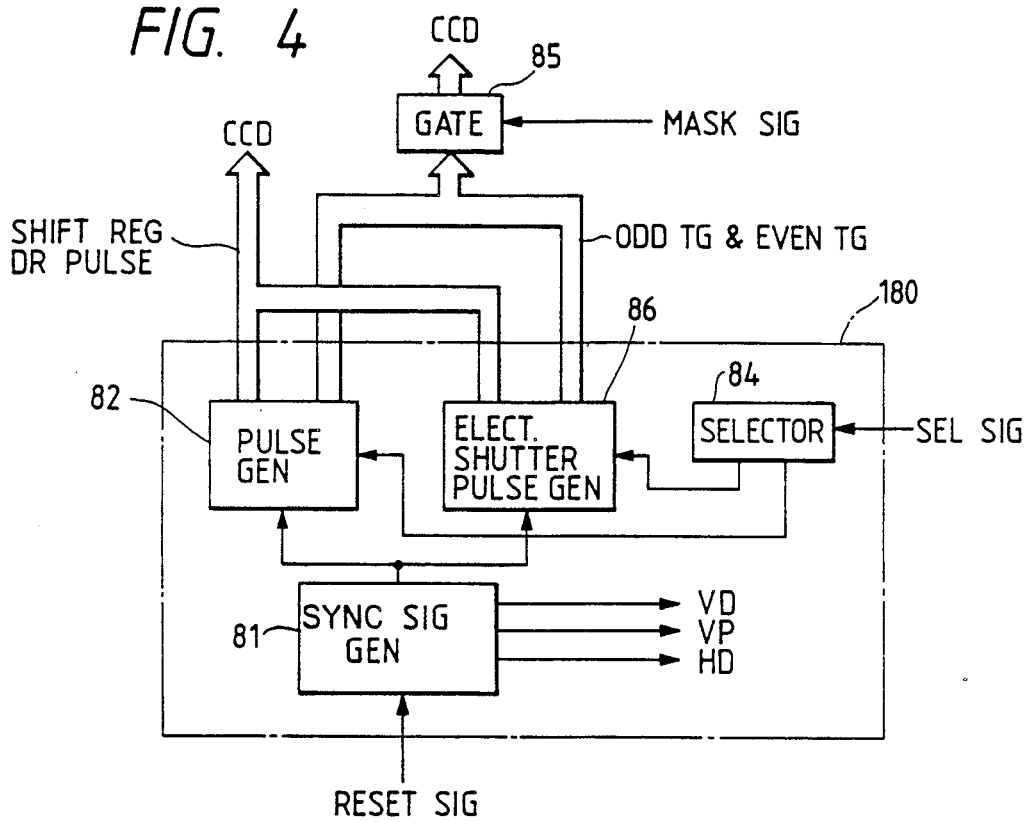
FIG. 4 is a circuit diagram showing a second embodiment of the timing pulse generator according to the invention.

FIG. 4 shows a second embodiment of the invention.

In the timing pulse generator 180 according to the second embodiment, an electronic shutter is used instead of a mechanical shutter, an electronic shutter pulse generator 86 is used in place of the field accumulation pulse generator 83 previously shown. The electronic shutter pulse generator functions as an electronic shutter. The manner of operation of the electronic shutter is disclosed in U.S. Pat. No. 4,743,778 assigned to the same assignee as that of the present invention. In brief, the electronic shutter controls the charge accumulation time by the time interval at which a transfer gate pulse is generated, and drives the vertical transfer shift register at a higher speed than usual for at least a portion of the charge accumulation time. Therefore, the number of odd TG and even TG transfer gate pulses generated per unit time is doubled and the time devoted to the changeover to the frame accumulation mode can be further reduced as compared with the previous embodiment in which the field accumulation pulse generator 83 is used.

Figure 3:
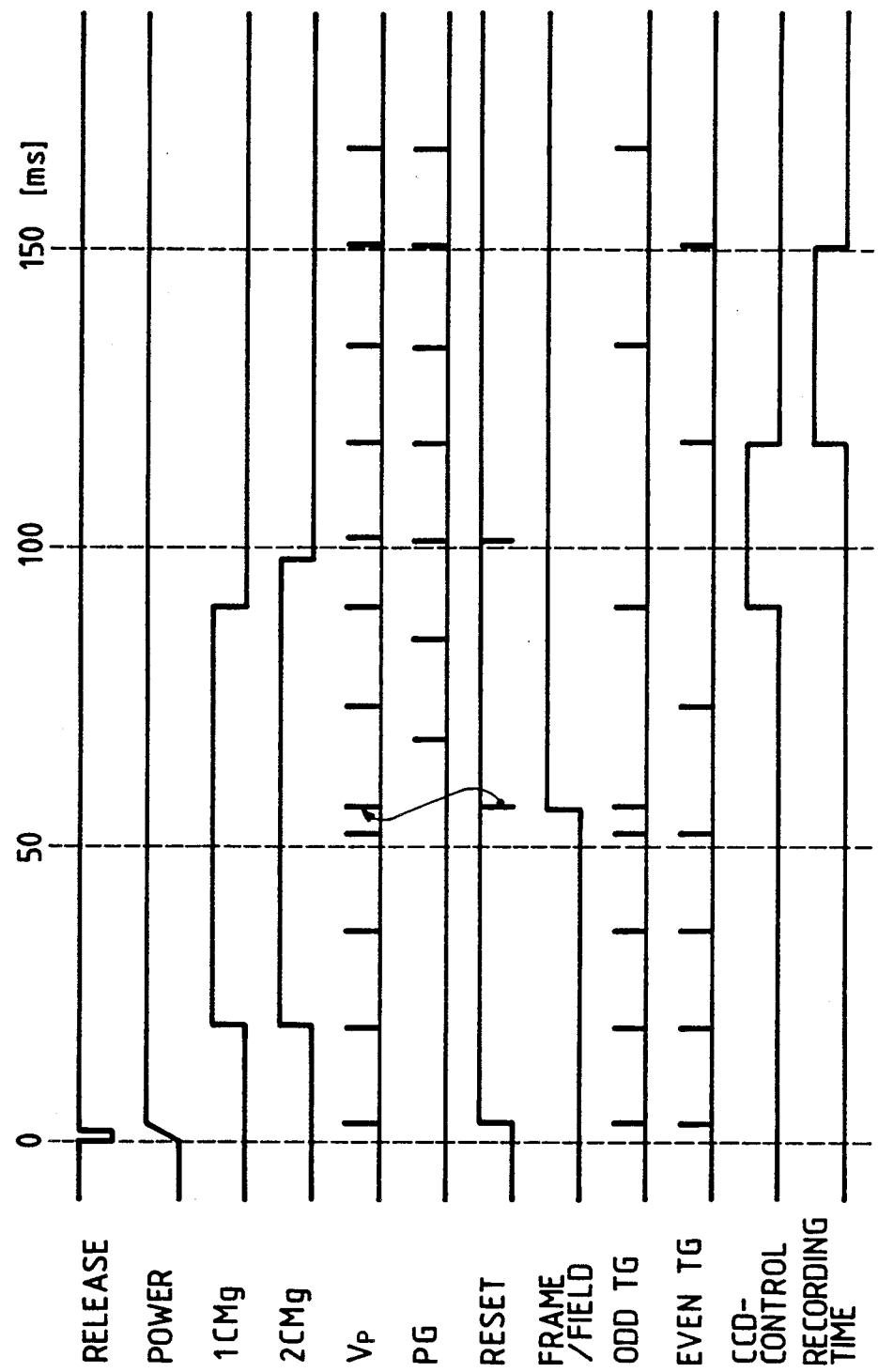
FIG. 3 is a time chart of the embodiment.

FIG. 3 is a time chart showing the manner of operation of the embodiment of the invention shown in FIG. 1A. The construction of the circuit of the embodiment corresponds to that of the prior art shown in FIG. 5 with the exception of the construction of the timing pulse generator circuit.

In the operational time chart shown in FIG. 3, a picture-taking operation starts with falling of a release signal and a power supply to every circuit shown above is switched ON.

At the falling of a 1 CMg signal, the leading shutter blade of the mechanical shutter starts running and at the falling of a 2 CMg signal, the trailing shutter blade starts running. In other words, an exposure is started at the start of the running of the leading shutter blade and the exposure is ended at the completion of running of the trailing shutter blade.

Vp is a signal synchronized with the vertical synchronizing signal with a delay of about 700 μsec. As previously described, a TG pulse signal is within the Vp pulse. The start of the running of the leading shutter blade mentioned above is in synchronism with a time immediately after the Vp signal.

PG is a signal for the recording start position of the magnetic disk at the recording portion. The signal is so controlled that one revolution of the disk is coincident with one period of the vertical synchronization time.

The reset signal RESET is used for the phase shift of a PG signal and a Vp signal during recording.

The frame/field signal is an accumulation mode selection signal. When the signal is High Level, the frame accumulation mode is selected, and when Low Level, the mode is the field accumulation mode.

The odd TG signals and even TG are signals for readout of charge from the solid state image pickup element The odd TG signal is used for readout of odd field pixels and the even TG signal for readout of even field pixels. In this embodiment, during the field accumulation mode, two TG pulses are generated for each field during one vertical synchronization period of time.

CCD control signal is a signal for masking (inhibiting) the charge readout signal. The latter signal is masked from the time of exposure start to a time directly before the start of recording. The time during which the exposed charge is readout from the image pickup element and recorded in the magnetic disk is determined by the recording time signal.

In this embodiment, the mode is in the field accumulation mode during the time of 56 msec. from releasing and during this time the charge of the solid state image pickup element is read out by odd and even TG signals each having a repetition rate the same as the vertical synchronization signals, so that unnecessary charges are completely discharged quickly. After such discharging, with a resetting operation, the mode is changed over to the frame accumulation mode. In this mode the repetition rate of each of the TG signals is half that of the vertical synchronization signals. After the frame accumulation has reached a stable state, that is, at 90 msec. after releasing, an exposure is started. If, with an electronic shutter, the field accumulation is carried out in the electronic shutter mode from the time of releasing, the time lag can be reduced further by two vertical synchronization periods. The time at which the resetting is carried out can be selected at will.

As will be understood from the foregoing, the present invention has the following advantages over the prior art:

The drainage of unnecessary charge from the solid state image pickup element can be carried out completely in a shorter time.

The time lag from releasing to exposure start can be reduced.

The time at which a resetting is carried out to change over the mode from field accumulation mode to frame accumulation mode, can be selected at will. Therefore, one can adjust the time lag from releasing to exposure start to any desired time length.

I claim:

1. An electronic still camera comprising:
   a charge accumulation type of solid state image pickup means for forming a video signal, said image pickup means having light-receiving portions corresponding to an odd field and light-receiving portions corresponding to an even field;
   an optical system for focusing light from an object on said image pickup means;
   shutter means disposed between said image pickup means and said optical system, said shutter means being opened after the lapse of a predetermined preparatory time from a shutter releasing operation to start an exposure of said image pickup means;
   signal generation means for generating a first timing signal by which said image pickup means outputs electric charges of the light-receiving portions corresponding to an odd field and a second timing signal by which said image pickup means outputs electric charges of the light-receiving portions corresponding to an even field, said first and second timing signals being in a synchronized relation; and
   control means for causing said signal generation means to output said timing signal, at a first repetition rate during a predetermined interval from the shutter releasing operation and, after the lapse of said predetermined interval, causing said signal generation means to output said timing signals at a second repetition rate less than said first repetition rate.

2. An electronic still camera according to claim 1, which further comprises recording means for recording image information formed on the basis of the electric charges outputted from said image pickup means in response to said first and said second timing signals when said first and said second timing signals are outputted at said second repetition rate.

3. An electronic still camera according to claim 1, wherein said predetermined preparatory time is a time from the shutter releasing operation to just before the exposure start.

4. An electronic still camera according to claim 1, wherein said first and second timing signals are generated substantially at the same time during said predetermined interval, and, after the lapse of said predetermined interval, said first and said second timing signals are generated alternately at regular intervals.

5. An electronic still camera according to claim 1, wherein said second repetition rate is half said first repetition rate.

6. An electronic still camera according to claim 1, wherein said first and second timing signals are synchronized with synchronization pulses generated at a predetermined repetition rate, said signal generation means outputs said first and said second timing signals to the respective fields in the form of pulses at the same repetition rate as said synchronization pulses during said predetermined interval and, after the lapse of said predetermined interval, at half the repetition rate of said synchronization signals.

7. An electronic still camera comprising:
a charge accumulation type of solid state image pickup means for forming a video signal, said image pickup means having light-receiving portions corresponding to an odd field and light-receiving portions corresponding to an even field;
an optical system for focusing light from an object on said image pickup means;
signal generation means for generating a first timing signal by which said image pickup means outputs electric charges of the light-receiving portions corresponding to an odd field and a second timing signal by which said pickup means outputs electric charges of the light-receiving portions corresponding to an even field, said first and second timing signals being in a synchronized relation; and
control means for causing said signal generation means to output said timing signals at a first repetition rate during a predetermined interval from a predetermined time and, after the lapse of said predetermined interval, causing said signal generation means to output said timing signals at a second repetition rate less than said first repetition rate.

* * * * *